Sept. 11, 1956     O. T. SCHULTZ ET AL     2,762,123
NAVIGATION SYSTEM Filed May 26, 1948     6 Sheets-Sheet 2

INVENTORS
O. T. SCHULTZ, L. B. SCOTT,
W. G. WING.
BY
Herbert P. Thompson
ATTORNEY.

Sept. 11, 1956　　　O. T. SCHULTZ ET AL　　　2,762,123
NAVIGATION SYSTEM
Filed May 26, 1948　　　　　　　　　　　　　　6 Sheets-Sheet 3

INVENTORS
O. T. SCHULTZ, L. B. SCOTT,
W. G. WING.
BY Herbert C. Thompson
their ATTORNEY Sept. 11, 1956  O. T. SCHULTZ ET AL  2,762,123
NAVIGATION SYSTEM
Filed May 26, 1948  6 Sheets-Sheet 5

INVENTORS
O. T. SCHULTZ, L. B. SCOTT,
W. G. WING.
BY
ATTORNEY.

United States Patent Office 2,762,123
Patented Sept. 11, 1956

2,762,123

NAVIGATION SYSTEM

Oscar T. Schultz and Larkin B. Scott, Seacliff, and Willis G. Wing, Hempstead, N. Y., assignors to Sperry Rand Corporation, a corporation of Delaware Application May 26, 1948, Serial No. 29,398

29 Claims. (Cl. 33—1)

This invention relates to automatic craft position indication and guidance systems, and, more particularly, concerns a navigational device rendering it possible to direct a piloted or pilotless craft along an arbitrary preassigned ground track or course to any objective whose latitude and longitude are known.

The apparatus of the instant invention provides a space stabilized element having the property of being capable of resisting a torque about any axis whatever without change in orientation. A gimbal system is also provided affording the space stabilized element complete freedom of angular motion relative to the craft on which it may be mounted, thereby establishing within the craft a fixed reference system that can remain unaltered by craft motion from which craft position may be accurately and rapidly ascertained.

In accordance with one embodiment of the instant invention, this space stabilized element is provided with a gimbal system affording three degrees of rotational freedom with respect to the craft on which it is mounted. The stabilized element is capable of maintaining a fixed orientation in space notwithstanding any motion, spurious or regular, of the craft. Also means forming an axis of rotation is provided and this axis of rotation is capable of being maintained parallel to the earth's axis of rotation. An element comprising in the preferred form, a semi-circular ring, may be pivoted on this axis and arranged to be rotatable with respect to the stable element. Means causing the ring to remain in a vertical plane with respect to the earth will enable the ring to represent the local meridian of the craft. The angular position of this ring with respect to the space stabilized element, measured about the aforementioned axis, will therefore be a measure of the geocentric right ascension of the local meridian of the craft. When combined with the Greenwich sidereal time, this gives the longitude of the craft. Means establishing a horizontal line in the plane of this ring is provided, and this line will form an angle, with the axis of support, equal to the latitude of the craft. If desired, visual indications of latitude and longitude may be transmitted from information obtained from the relative position of this ring and of the vertical line to appropriate dials.

Mechanisms for automatic flight control, if it is desired to guide the craft to a predetermined latitude and longitude, may be associated with the apparatus hitherto described and by comparing data obtained from the device of the instant invention with recorded values of latitudes and longitudes of points on the intended ground track or course of the craft, means are thereby provided that will control the craft to follow this preselected course.

In the system thus far disclosed, indications of latitude and longitude will have an accuracy limited by the accuracy of the vertical defining means and by the accuracy of orientation of the stable element. While in the present state of the art it is possible to construct stable elements with very low drift rates, if a still higher degree of accuracy is desired, means for periodically monitoring the orientation of the stable element through the use of some external reference may be included. For example, means providing for periodic reference to preselected celestial objects may be provided to thereby greatly increase the accuracies obtainable from the space stabilized element. Celestial observations, however, need only be occasional, for as will be described hereinafter, the accuracies obtainable from the space stabilized element are such as to not require constant monitoring but only infrequent reference, the timing being dependent upon the drift rate of the stable element.

The particular form set forth herein has advantages that would not be possessed by similar types of instruments in general. One of these advantages results from the fact that only angular quantities appear in the solution of the problem so that end play in any of the axes of the instrument is of no consequence.

A desirable feature of any celestial navigational device resides in the provision of the star follower and the vertical reference in a unitary mounting which permits no change in relative orientation due to deflections of the craft structure. This feature is incorporated in the proposed construction, the entire instrument being supported in the craft by only two bearings. For example, these bearings might be attached to a mounting plate of slightly greater diameter than the greatest width of the stable element gimbal system, the mounting plate fitting into a corresponding opening in the upper structure of the craft. This construction has further advantage in that the precise alignment required between the stable element and the star follower could then be carried out in the laboratory. The installation of the instrument in the craft would then consist simply of lowering it through an opening and fastening the mounting plate to the craft structure, the orientation of the instrument with respect to the craft not being critical.

The primary object of the instant invention is to provide a completely automatic navigation system embodying a self-contained unit that may be entirely independent of any external reference source in its operation.

A further object is to provide a self-contained navigation system capable of maintaining an accuracy suitable for the guiding of craft for short ranges.

A further object is to provide a celestial navigation device which in conjunction with the self-contained navigational unit will assist in providing accuracy of operation independent of range.

A still further object is to provide a navigational instrument for a craft having an accuracy such that reference to celestial observations by an operator need be infrequent, and then only for the purpose of affecting minor changes as required by inaccuracies that may occur in the space stabilized element.

Another object is to provide an automatic craft position indicator and guidance system employing a space stabilized reference and having a celestial reference device associated therewith for occasional monitoring purposes.

Invention also relates to the novel features or principles of the instrumentalities described herein, whether or not such are used for the stated objects, or in the stated fields or combinations.

The stable element

Figure 1:
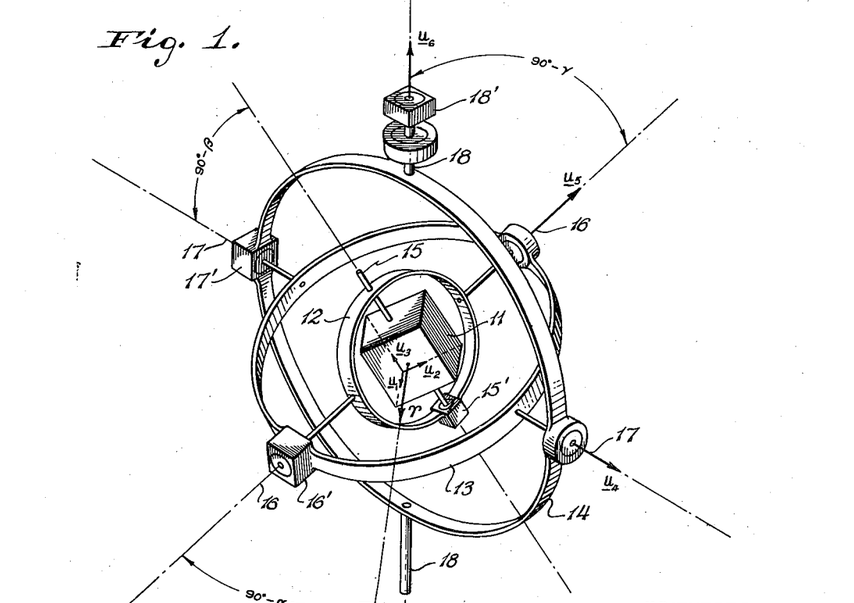
Fig. 1 illustrates a space stabilized element with associated mounting.
Figure 2:
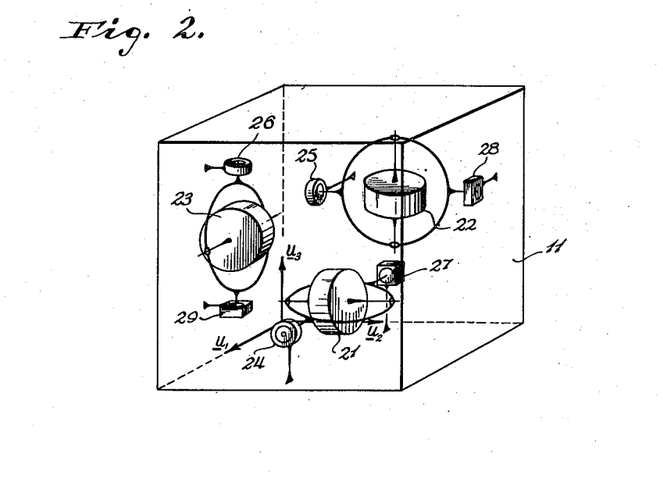
Fig. 2 illustrates a possible arrangement of gyroscopes within the space stabilized element.

The basic element of the system to be described herein is a space stabilized element 11 which in this instance may comprise a unit containing three gyroscopes arranged to provide the unit with the property of resisting a torque about any axis whatever without change in orientation. The space stabilized element 11 is illustrated in Fig. 1 as comprising a cubical box. By virtue of the apparatus contained within the box, the box itself may be considered as being stabilized in space so as to resist a torque about any axis. This property may be achieved by the arrangement of gyroscopes as illustrated in Fig. 2 wherein the gyros 21, 22 and 23 are mounted within the box 11. The spin axes of the gyros 21, 22 and 23 are arranged to be mutually perpendicular. Pick-offs 24, 25 and 26 are provided for the gyros 21, 22 and 23 respectively and these pick-offs have a signal output responsive to motion about an axis perpendicular to the respective spin axes of the gyroscopes 21, 22 and 23. In order to cause the stable element to maintain a fixed orientation in the presence of persistent disturbing torques, torque producing means 16', 17' and 18', hereinafter referred to as external torquers, are provided, and in accordance with proper signals (responsive to deviations of individual gyroscopes) will exert a torque on the stable element 11 to neutralize the disturbing torque. Thusly, the element 11 is maintained in a predetermined orientation relative to space. By virtue of the arrangement illustrated and described, the stable element 11 is provided with means for maintaining a fixed orientation relative to space and has the property of being capable of resisting a torque about any axis whatever without change in orientation.

The orientation of the stable element 11 as herein defined refers to its orientation with respect to an inertial coordinate system rather than with respect to a coordinate system fixed to the rotating earth. This definition assumes importance in the descriptions following when mention is made of orientation or direction in space. In a practical sense an inertial coordinate system is one in which the stars have fixed directions.

Stable element gimbal system

The space stabilized element 11 is gimballed by means of the three gimbals 12, 13 and 14, each having two mutually perpendicular axes, the outer two of which provide three degrees of rotational freedom with respect to the craft in which the element may be carried, and is capable by virtue of the gyros contained within the element 11, of maintaining fixed orientation in space notwithstanding motion of the craft. More particularly the innermost gimbal 12 is secured to the stable element 11 and has means providing an axis 15—15 which may be made to remain parallel to the earth's axis of rotation. The innermost gimbal 12 in turn is pivotally mounted on means providing an axis 16—16, which is mounted to be pivotable in the center gimbal 13. Axis providing means 17—17, pivotable in the outer gimbal 14, is secured to center gimbal 13, and outer gimbal 14 has attached thereto posts providing an axis, 18—18. In the arrangement set forth, a gimbal system is provided, giving the space stabilized element three degrees of rotational freedom with respect to its supporting body.

Latitude and longitude determining devices

Figure 4:
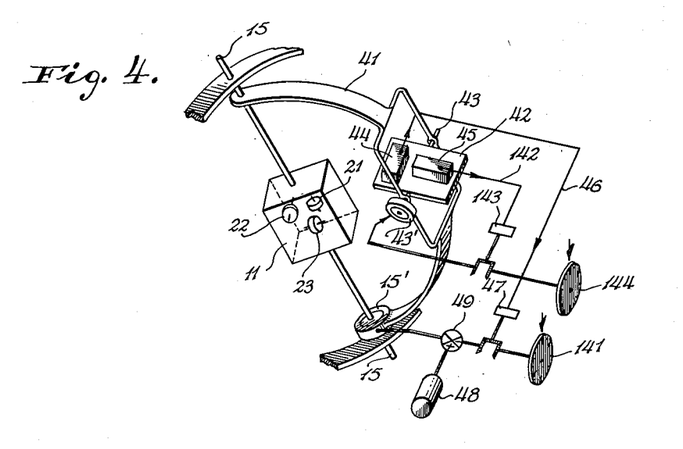
Fig. 4 illustrates the horizontal platform together with simplified levelling circuits.

To illustrate the manner in which the space stabilized element is utilized to provide data from which latitude and longitude may be determined, the ring 41 illustrated in Fig. 4 may be considered to define a plane including an earth's meridian. By causing ring 41 to remain in a vertical plane the local meridian of the craft may be represented. The amount of rotation of the ring 41 about the pivot axis 15—15, when combined with Greenwich sidereal time, is therefore a measure of the longitude of the craft. A vertical line in the plane of ring 41 forms an angle with the axis of support 15—15 equal to the co-latitude (90° latitude) of the craft.

To provide means for establishing the aforementioned vertical line, gravity sensitive elements or other appropriate vertical determining means may be mounted on the ring 41 and their indications utilized, after a smoothing process, to position the ring 41 in a vertical plane and to establish a vertical line in that plane. The latitude and longitude indications may be transmitted to dials or counters for visual reference. For automatic flight control the values of latitude and longitude obtained may be transmitted to other mechanisms which would compare these values with recorded values of latitude and longitude on the intended course of the craft and thereupon control the craft heading to cause it to follow this predetermined course or ground track. While the description thus far has set forth generally, the essential elements of one embodiment of the instant invention, a detailed description of the vertical seeking device on ring 41 and of other mechanisms hereinbefore generally identified will appear after the following description of some of the general concepts of the navigational problem involved.

The navigation problem

Figure 5:
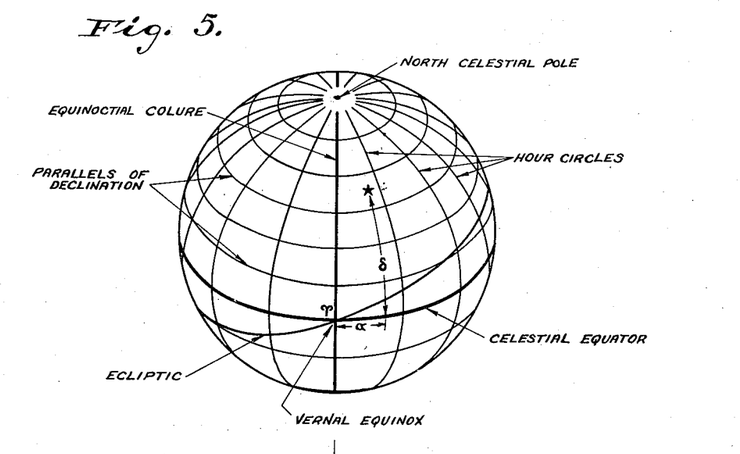
Fig. 5 illustrates coordinates on the celestial sphere.

The stable element could in fact be imagined as possessing a spherical surface bearing a star map as illustrated in Fig. 5. If this sphere were large enough, the navigator could place himself at its center and carry out his usual navigational practices by observing the star images on its surface instead of the real stars in space. Navigation methods which would normally be classed as celestial, are more accurately characterized in their use of a vertical reference and angular measurements, than they are by their use of celestial observations, since celestial observations might be dispensed with entirely without any fundamental changes in the theory or practise of celestial navigation.

The greatest difficulty in the practical realization of a device operating on the foregoing principle is the attainment of a gyroscopically stabilized element which is capable of maintaining its orientation in space with the required degree of accuracy. In th proposed system, therefore, the gyroscopic stabilization may be supplemented by celestial observations which would serve to correct any changes in orientation due to imperfect gyroscopic action. It will be seen later that the use of celestial observations as a supplement to gyroscopic stabilization, rather than as a substitute for it, leads to important operational advantages which would be difficult to obtain by any other means. In principle, this correction could be accomplished by mounting two telescopes on the stable element, which telescopes could be arranged to continually point at two arbitrarily selected stars as long as the stable element retained its proper orientation. Any departure of the stable element from this orientation would cause the star images to act on apparatus such as phototubes in such a way as to restore the space stabilized orientation of the element. The three-gyro stable element is particularly well suited to this type of control. The practical difficulties entailed in mounting the telescope directly on the stable element are overcome by placing the star follower in a position remote from the stabilized element and positioning them relative to the craft, by servo systems operated from the stable element, the control of the stable element by the star follower being in no way different from that just described. It will be seen that, as one of the advantages of the use of a gyroscopically stabilized element, it is possible to use a single star follower to perform the functions that would ordinarily require two.

*Stable element and star follower*

Figure 6:
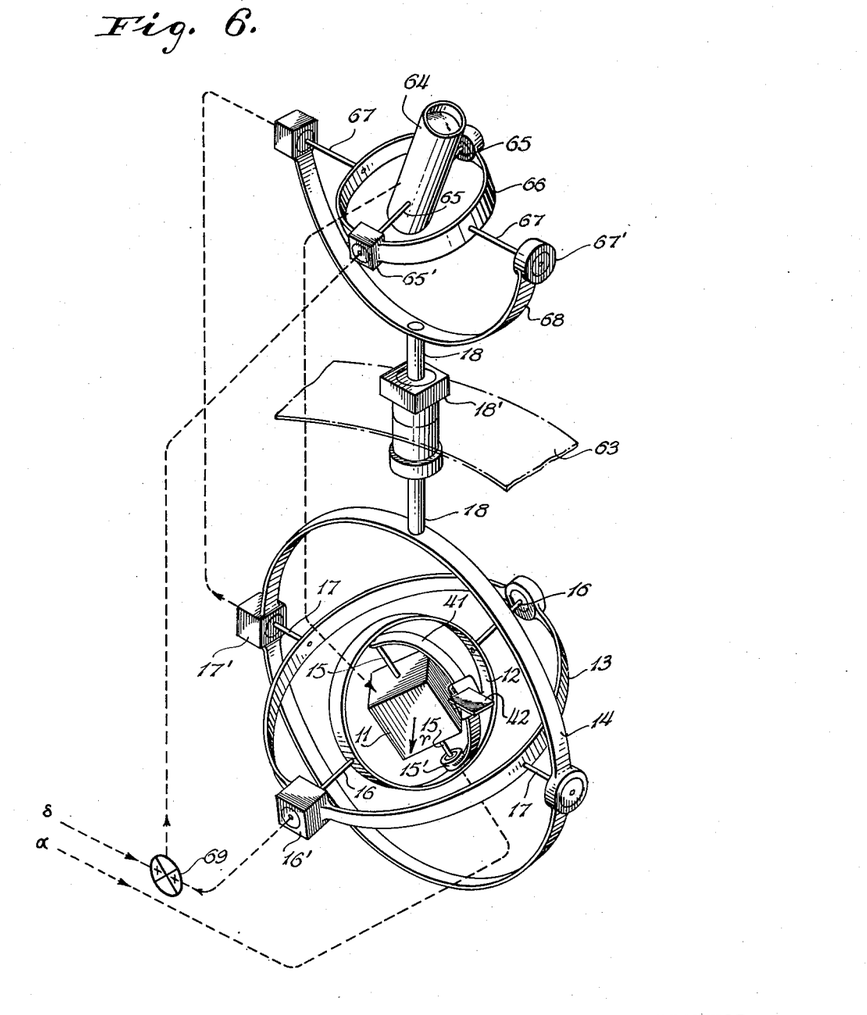
Fig. 6 illustrates the gimbal system of the stable element and the star follower.

The apparatus of Fig. 6 illustrates the mounting of the stable element and the star follower. While this is the preferred method of positioning these two devices, it must be recognized that subject to the limitations of introducing extraneous errors, the star follower may be removed from the stable element. Also it must be recognized that while certain elements of a star follower are controlled remotely in position by the position of corresponding elements in the stable element of its associated mounting means, additional mechanical connections could be provided if desired to replace existing electrical connections. In the preferred embodiment, and as illustrated in Fig. 6, the stable element and the star follower are pivoted in gimbal systems carried at opposite ends of the shaft 18 which is supported in the craft on bearings. A star follower projects above the craft structure 63 and may be enclosed in a transparent dome (not shown) while the gimbal system of the stable element may be positioned inside the craft.

The stable element 11 is supported on an axis 15—15 which is pivoted in gimbal ring 12. An axis 16—16 perpendicular to 15—15 supports ring 12 in another ring 13. Ring 13 is supported on axis 17—17 perpendicular to 16—16, in a fork or gimbal 14 which forms the lower end of shaft 18. For purposes of illustrating the operation, first assume that the axis 15—15 is clamped in ring 12 while the axes 16—16, 17—17 and 18—18 are free to rotate in their bearings. The stable element 11 then has three degrees of rotational freedom with respect to the craft and can maintain a fixed orientation in space while the craft moves about the earth and undergoes random changes in attitude. (The exceptional case in which axes 16—16 and 18—18 are aligned and one degree of freedom is lost will be discussed presently.) The axis 15—15 is to remain parallel to the earth's axis of rotation with the upper extremity toward the north. The axis 15—15 will be referred to as the polar axis of the stable element 11. A plane through the center of the stable element and perpendicular to 15—15, therefore, remains parallel to the earth's equatorial plane and will be referred to as the equatorial plane of the stable element. A normal to one of the faces of the stable element is indicated by the symbol $\gamma$ and is to remain directed toward the vernal equinox, that point of the celestial equator having right ascension zero.

The star follower comprises telescope 64 pivoted on an axis 65—65, perpendicular to its optical axis, in a gimbal ring 66. The ring 66 is pivoted on an axis 67—67, perpendicular to 65—65, in a fork 68 which forms the upper end of shaft 18. The planes of the upper and lower gimbals 68 and 14 coincide, and the axes 67—67 and 17—17 are perpendicular to 18—18. Assume that the rotation measured at the bearing of torquer 17' is transmitted to bearing 67', as indicated by the dotted connection of Fig. 6, either by a servo or by a mechanical connection. The plane of ring 66 will thereby be caused to remain parallel to the plane of ring 13, and axes 65—65 and 16—16 will remain parallel. To complete the connection of the star follower to the stable element, the rotation measured at the bearing of torquer 16' is transmitted to the bearing of torquer 65' with provision being made for the introduction of a differential rotation between them through the different 69. If $\delta$, the input to the differential from an external source remains constant, the telescope will by these connections remain in a fixed orientation relative to the ring 12. The connection from 16' to 65' is to be set up in such a way that the optical axis of the telescope is parallel to the equatorial plane of the stable element when $\delta=0$, while for positive values of $\delta$ the optical axis is to approach the position indicated by the upper extremity of axis 15—15. Since the telescope has a fixed orientation with respect to the ring 12, and since it has also been supposed that the polar axis of the stable element is clamped in the ring 12, the telescope 64 also has a fixed orientation with respect to the stable element 11. This gimbal system therefore satisfies the requirement that the telescope 64, as far as its orintation in space is concerned, is to behave as though it were mounted directly on the stable element.

Up to this point the assumption has been made that $\delta$ remains constant while the stable element 11 remains clamped in ring 12, and there has been no consideration of the method of adjusting the orientation of the telescope 64 relative to the stable element to allow the observation of different stars. If $\delta$ is varied, it is evident that the optical axis of the telescope sweeps out a plane containing the polar axis and having a fixed position in the stable element. From the conventions that have been adopted for the measurement of the rotation $\delta$, this angle is the declination of the optical axis of the telescope. To change the right ascension of the optical axis, a rotation $\alpha$ is introduced between the polar axis of the stable element 11 and the gimbal ring 12. The effect of such a rotation is best illustrated by supposing that 12 remains fixed and the stable element 11 rotates with respect to it about axis 15—15. Such a rotation causes no change in the angle between the optical axis and the equatorial plane of the stable element and therefore leaves the declination unchanged. However, it does cause a relative rotation of the optical axis about the polar axis. The supposition that the ring 12 remains fixed while the element 11 rotates with respect to it is, of course, in disagreement with the fundamental assumption that the orientation of the stable element remains unchanged. In actuality, therefore, the introduction of such a rotation $\alpha$ must leave the stable element fixed and produce a rotation of the gimbal ring 12 about it, but the relative orientation of the telescope 64 and stable element 11 will change in exactly the way previously described. The right ascension of the optical axis then changes by the angle $\alpha$ introduced as a relative rotation between the stable element 11 and the gimbal ring 12. The system is to be set up so that $\alpha=0$ when the optical axis lies in the plane determined by the axis 15—15 and the normal $\gamma$, and $\alpha$ is to increase as the telescope moves eastward (i. e. when its rotation about the stable element 11 is clockwise as viewed from the lower extremity of the axis 15—15 toward the upper extremity of that axis).

The gimbal lock position in which the axes 16—16 and 18—18 are aligned can now be considered. Under these conditions the axes 65—65 and 18—18 are also aligned and the optical axis of the telescope is perpendicular to 18—18. Since the instrument is to be mounted in the craft so that 18—18 is approximately vertical when the craft is in a level attitude, the telescope is directed toward the horizon. If the craft is not level, the gimbal lock position occurs when the optical axis is above the horizon by an angle equal to the tilt of the craft. Since stars close to the horizon are not favorably situated for observation for other reasons, the gimbal lock position is automatically avoided by the selection of suitable navigational stars.

As mentioned previously, with the use of a space stabilized element it is possible to use a single star follower to observe two stars alternately. This would be accomplished in the following way: The inputs of δ and α would be made by means of synchros. An α synchro and δ synchro would be provided for each of the two stars and would be set by hand or other means, to positions corresponding to the right ascension and declination of each star. A motor driven switch could then be provided to alter the connections of the remainder of the system to the two sets of synchros, and the star follower would periodically shift from one to the other of the two stars. In pilotless aircraft an obvious extension of this process would allow the use of a preselected sequence of stars during the course of a long flight, a pair of preset synchros being necessary for each star to be used.

While the method of employing the phototube signals from the telescope to correct the orientation of the stable element will be more fully described later, for the present it is sufficient to note that the information obtained from a single star is adequate to orient the stable element completely except for a rotation about the line of sight and that a second star is necessary to remove this uncertainty. The optimum separation of the two stars being used at any time is 90°. The separation is not at all critical however, and any value between 45° and 135° would serve about as well.

If the sun, moon, or planets are to be used instead of stars, it is necessary to take into account their changing coordinates. There are several possible ways of doing this. In piloted aircraft it would be sufficient for the operator of the instrument to change the settings of right ascension and declination from time to time. An alternative method would be to drive the right ascension and declination synchros continuously at rates equal to the rates of change of the two coordinates. In pilotless aircraft, where the position need not be accurately determined until the objective is reached, the values of right ascension and declination could be preset to the values they would have at the estimated time of arrival of the aircraft at its objective. Similar methods could be used to account for the moon's parallax and for refraction of any object, although refraction need not be considered unless circumstances require the use of objects rather close to the horizon.

*The Vertical reference*

Consideration is now given to the relationship of the gravity-sensitive or vertical seeking elements to the stable element. In Fig. 4 the stable element is illustrated as though removed from its supporting gimbals. The plane of ring 41 is to be maintained vertical by the action of the gravity-sensitive elements to be described presently. In the manner to be described, the angular position of ring 41 with respect to the stable element 11 counted eastward from the direction γ of the vernal equinox, will be the right ascension of the local meridian. This angle, however, is equal to the local sideral time $\theta_L$ and, if the local sidereal time is substracted from the Greenwich sidereal time $\theta_G$, the result $\lambda = \theta_G - \theta_L$ is the longitude of the craft. In the form of construction to be described, it is possible to obtain a remote indication of the angle $\theta_L$ measured at the bearing 15' of the ring 41. This angle is combined through differential 49 with the output of a constant speed motor 48 (which motor is equivalent to a clock reading Greenwich sidereal time) to give λ, the longitude angle.

A section of the ring 41 is divided to form a support for a small platform 42. This platform 41 is pivoted with respect to the ring 41 about an axis 43—43, normal to the plane of the ring. If the normal to the platform is maintained vertical, or the surface of the platform itself is maintained horizontal, the latitude of the aircraft can be obtained as a rotation φ measured at bearing 43'.

In order to bring platform 42 into a horizontal position, it is provided with two levels or other vertical defining means, one level 44 having its length in the direction of the axis 43—43 and the other level 45 being perpendicular to this. Levels 44 and 45 may be the type disclosed in Fig. 1 of Patent No. 2,367,465 granted to H. Kunzer on January 16, 1945, for example. The upper terminals of each of these levels may be connected across a center tapped source of D. C. voltage to produce electric signals between the central terminals of the levels and the center tap of the voltage source which, together, specify the direction, relative to the platform, of the resultant of the gravitational and acceleration forces acting on the platform. The signal which is obtained from the level 44 indicates whether or not the plane of the ring 41 is vertical. This signal is used as the input to a low speed motor 47, the output of which is manifest in a shaft rotation whose rate is proportional to the magnitude of the input signal. The speed of the output shaft of motor 47 is preferably reduced by a gear train so as to achieve an integrating or smoothing effect. While it would be possible to use the output of motor 47 directly to rotate the ring 41 with respect to the stable element 11, the preferred method is to introduce a differential rotation equal to the Greenwich sidereal time between the output of the motor 47 and the rotation of the ring 41 about the polar axis 15—15. These connections are indicated schematically in Fig. 4. If the plane of the ring 41 is not vertical, a signal is developed by the level 44. This signal is transmitted by the line 46 to the motor 47, thereby causing the motor to rotate at a rate proportional to the signal and in a direction as to restore the plane of the ring 41 to the vertical. The advantage of introducing the Greenwich sidereal time in the way shown will be clear if it is supposed that the craft is in a fixed position on the earth. In this case the local meridian rotates in space with a rate equal to the angular rate of rotation of the earth. The ring representing the local meridian must therefore rotate about the stable element at this rate. If the output of the motor 47 positioned the ring 41 directly, a constant error signal from the level would be necessary in order to produce the required rotation of the ring. By introducing the Greenwich sidereal time from the constant speed motor 48 as a differential rotation through the differential 49, the rotation of the ring 41 required to account for the earth's rotation is produced without the necessity of an error signal from the level 44. When the ring 41 has been brought into a vertical plane by the process just described, the angle measured at the bearing 15' is the local sidereal time $\theta_L$. This angle is the difference between the Greenwich sidereal time $\theta_G$ and the integrator output. The integrator output is therefore the longitude of the aircraft and is illustrated in Fig. 4 as being displayed on a dial 141.

The level 45, perpendicular to axis 43—43, is similarly connected through line 142 to a low speed motor 143 whose output rotates the platform about the axis 43—43 until the signal from the level 45 becomes zero. Preferably the speed of the output shaft of motor 143 is reduced by a gear train so as to achieve an integrating or smoothing effect in the same manner as achieved at the output shaft of motor 47. Here it is unnecessary to account for the earth's rotation. The output from motor 143 is equal to the rotation at the bearing 43' and this rotation is a measure of the craft's latitude when the platform 42 is level, and this latitude may be displayed on the dial 144.

The operation of this vertical seeking system is not subject to the same objections as are other systems which attempt to dispense with a vertical gyro by the use of a damped long period pendulum or level. In the usual type of vertical gyro system, the gravity-sensitive elements cause the gyro to precess toward the vertical at an angular rate, relative to inertial space, proportional to the resultant indication of the gravity-sensitive elements. An exactly similar action is obtained in the present system by causing the integrator outputs to position the level platform relative to a space stabilized element. The availability of this stable element in the system makes it possible to obtain the effect of a vertical gyro without requiring the actual presence of such a gyro in the system.

*Orientation of the stable element*

A stable element constructed in accordance with the previous description would theoretically maintain a fixed orientation in inertial space regardless of the presence of disturbing torques. Instantaneous torques of great magnitudes would be resisted by the action of the three gyroscopes, the maximum torque being limited only by the strength of the mechanical parts. Steady torques would be resisted initially by the action of the gyros and ultimately by the action of the torquers, the resistance to steady torques being limited by the strength of the torquers.

It has been seen that disturbing torques (i. e. torques that are applied to the stable element as a whole) have no effect in changing its orientation. In practice such disturbing torques might arise from unbalance of the stable element, from friction in its supporting gimbals, from inertial forces necessary to accelerate the gimbals as the attitude of the craft changes, etc. A recognition of the causes of drift of the stable element (such as may be occasioned by friction in the pivot bearings of the gyro) indicates the manner in which drift can be corrected, providing means is available for detecting its occurrence. In the present embodiment the star follower provides a means for detecting the drift of the stable element; and the method of correcting the orientation of the stable element is now considered. Since any change in orientation must be produced by torques acting on the gyros about their pivot axes, a means must be provided for the deliberate application of such torques when it is desired to correct the orientation of the element. For this purpose each gyro pivot axis is equipped with a torquer which can exert a torque between that axis and the structure of the stable element proper. These motors will be referred to as internal torquers to distinguish them from the external torquers, herein also described, which act on the gimbals supporting the stable element. Considering the gyro 23, of Fig. 2, a torque applied to its pivot axis produces a proportional precessional rate of the spin axis. In its precession the gyro 23 carries the whole stable element 11 with it and the stable element will have an angular velocity proportional to the internal torque applied. Similar statements apply to the other two gyros considered separately and to all three gyros acting simultaneously, so that signals applied to the internal torquers produce an angular velocity of the stable element in space. In exerting a torque on one of the three gyros, each internal torquer applies an opposite torque to the structure of the stable element. This torque is resisted immediately by one of the gyros and ultimately by the external torquers in the same manner as any other disturbing torque applied to the stable element as a whole.

The description of the stable element may be summarized briefly by considering it a box which has been gimballed with respect to the craft in a manner which permits three degrees of rotational freedom. This box can be given an arbitrary angular velocity relative to inertial space by supplying the three internal torque motors with signals proportional to the three components of the desired angular velocity, these components being along axes fixed with respect to the box. This angular velocity will be realized without regard to disturbing torques acting on the stable element. In the special case in which no signals are applied to the internal torquers, the stable element will maintain a fixed orientation in space except for slow changes resulting from imperfect construction.

*The star follower*

Hereinbefore the star follower was described as a telescope gimbaled with respect to the aircraft and controlled by servos from the stable element in such a way as to maintain a fixed orientation with respect to it during the time that a single star is under observation. Consideration is now given to the internal structure of the star follower itself and the method of controlling the stable element with the signals obtained from it. For this purpose, the gimbal systems of the stable element and telescope are quite immaterial provided they have the effect of maintaing the telescope in a fixed orientation relative to the stable element. Therefore, it might be imagined that the telescope is mounted directly on the stable element, being clamped in a position corresponding to the right ascension and declination of the star under observation. If the stable element is correctly oriented, the optical axis of the telescope will be directed toward that star, and an image of the star will be formed at the center of the focal plane of the telescope. If the stable element drifts from its correct orientation, the star image will move away from the center of the focal plane, and this displacement of the image will produce the signals on the internal torque motors of the stable element necessary to reposition the stable element in orientation. A rotation of the stable element about the optical axis of the telescope produces no displacement of the star image. Any other change in orientation produces a total displacement of the image which can be described in terms of two perpendicular components of displacement relative to a system of axes fixed in the telescope. In order to realign the optical axis with the direction of the star, the signals from the telescope are required either to convey information about both of these components, or some equivalent information. The star follower is described in more detail in the copending application Serial No. 29,399 of Larkin B. Scott entitled "Radiant Energy Tracking Apparatus," filed on May 26, 1948, Patent No. 2,513,367, granted July 4, 1950.

Figure 12:
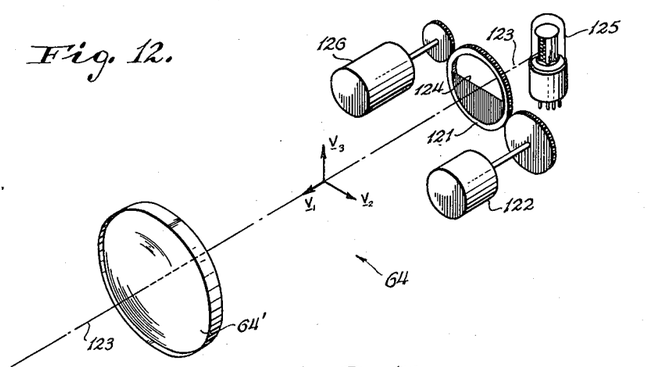
Fig. 12 is an illustration of components of a star follower telescope employing a rotating mask.

In the preferred method, the displacement of the star image from the center of the focal plane of the telescope may be measured in terms of its polar coordinates instead of in terms of its rectangular components. One acceptable configuration includes a semicircular mask 121, placed in the focal plane of the telescope 64, as illustrated in Fig. 12. The mask 121 is rotated by a motor 122 about an axis 123—123, coinciding with the optical axis of the telescope 64, and the edge 124 of the mask passes through the axis of rotation. A phototube 125 is placed behind the mask in such a position as to receive on its sensitive surface any light passing the mask. Considering the image of the star to be a small bright circular disk, this disk will be centered on the axis of rotation if the optical axis of the telescope is directed toward the star. For any rotational position, the mask 121 will obstruct half of the light forming the image, and the voltage developed by the phototube will not vary as the mask rotates. If the telescope is not pointed directly toward the star, the center of the star image will not coincide with the center of rotation of the mask, and the mask will intercept a maximum amount of light at one point of its revolution and a minimum amount of light at another point 180° away. Under these circumstances, the phototube voltage will contain an alternating component, and this component is the signal which indicates that the image is not at the center of the focal plane. As the image moves away from the center, the amplitude of the signal increases until the edge of the image disk passes through the center of rotation. For greater displacements the peak amplitude of the signal remains constant but its wave form will more and more closely approach a square wave. The amplitude and wave form of the signal therefore give a measure of the distance of the image from the center of the focal plane. In order to be able to infer the direction of the displacement of the star image from the optical axis 123—123 from the nature of the signal, alternating current generator 126 is driven from the shaft which rotates the mask so that the phase of the reference voltage obtained from the generator may be used as an indication of the rotational position of the mask. The phase angle of the signal relative to the reference voltage is then the polar angle of the displaced image. When considered in connection with the reference voltage, the phototube signal therefore specifies completely the displacement of the image from the center of the focal plane.

In the arrangement of mask and phototube that has been described, the amount of light reaching the phototube during one revolution of the mask is just half of the total amount of light reaching the focal plane, the mask absorbing the other half of the light during its revolution. This rejected light contains as much information about the position of the image as does the light which reaches the phototube and in the preferred embodiment it is desirable to make equal use of it.

An alternative method includes using a mask with a reflecting front surface which, instead of absorbing the light which does not pass beyond the mask, reflects it into a second phototube which produces a signal similar to but 180° out of phase with that from the first tube. The signals from the two phototubes could then be used as inputs to a push-pull amplifier (not shown), and the resulting output signal would have an appreciably higher signal-to-noise ratio than that obtained from a single phototube.

Figures 13, 14, 15:
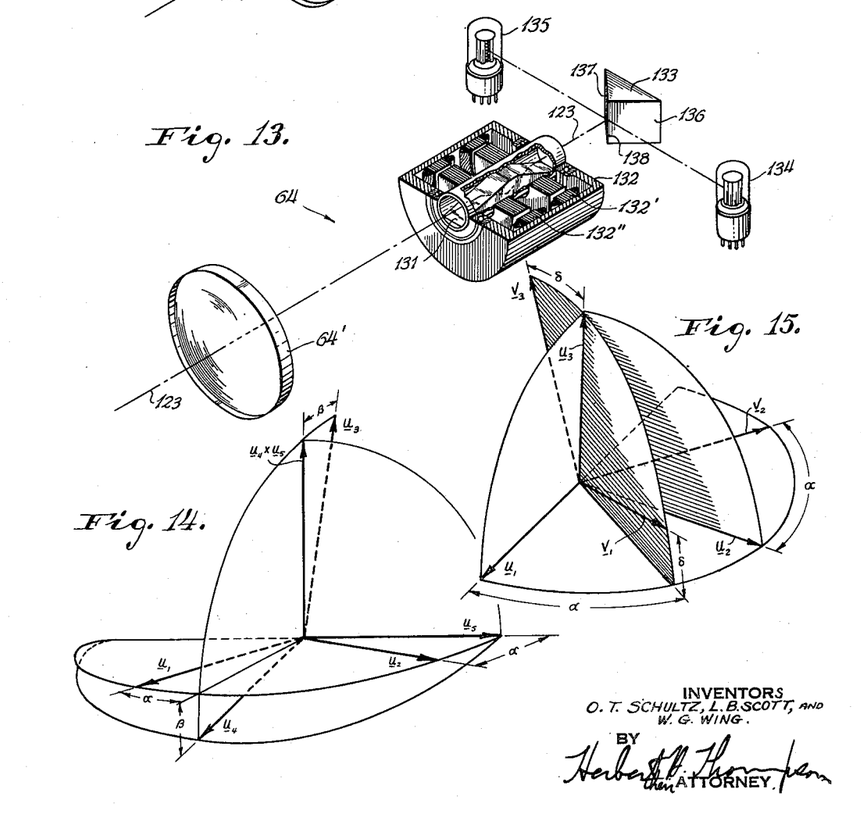
Fig. 13 is an illustration of components of a star follower telescope emplying a rotating reversion prism.
Fig. 14 illustrates the relation between the unit vectors of the stable element and the unit vectors of the stable element gimbal system.
Fig. 15 illustrates the relation between the unit vectors of the stable element and the unit vectors of the telescope.

In the preferred embodiment, the field of view is rotated on a stationary mask, accomplished by rotating a so-called "reversion prism," sometimes also known as a "Dove prism," 131 in front of the telescope objective 64', instead of rotating the mask in a stationary field of view. The reference voltage will now be obtained from a generator 132 which is rotated with the prism 131. Since the mask is now stationary, it is possible to substitute a reflecting prism 133 for it, the prism 133 reflecting the light of the image into one or the other of the two phototubes 134 and 135. This field dividing prism 133 will have two sloping reflecting faces 136 and 137 which meet in an edge 138 which occupies the position formerly occupied by the edge of the mask, the reflecting faces forming equal angles with the focal plane and the two phototubes being placed opposite the sloping faces 136 and 137.

The prism 131, may either be placed in front of the objective of the telescope (where it does not introduce aberrations into the optical system but requires that the aperture of the prism be as large as that of the objective) or it may be placed between the objective and the focal plane, thereby permitting a reduction in the size of the prism. The latter arrangement is illustrated in Fig. 13. In the arrangement illustrated, a very compact design becomes possible, since the prism 131 may be contained in the hollow shaft of the unit 132, which includes motor 132' and reference generator 132". Other forms of prisms, or optical means may be used to accomplish the same purpose, the purpose being to rotate the field as it falls on the focal plane to be described hereinafter. Fig. 13 illustrates a refracting telescope objective 64', although a similar arrangement of motor, prism, and phototubes would be equally convenient for use with a reflecting telescope. By virtue of the action of the reversion prism, if the star lies on the optical axis of the telescope, the prism does not cause any deflection of the image. The image therefore falls on the edge 138 of the field dividing prism 133 and its light is divided equally between the two phototubes 134 and 135 for any rotational position of the prism 131. If the star does not lie on the optical axis, 123—123 the prism 131 displaces the image in the same way that it would be displaced if it were simply reflected from the base of the prism. As the prism 131 rotates, the image therefore describes a small circle about the optical axis and the image falls on each of the sloping faces 136 and 137 during half of its revolution. A larger displacement of the optical axis from the star image has the effect of increasing the radius of the circle described by the star image. Displacements in different directions produce no effects on the image which would be evident by visual observation but operate to change the phase relationship between the signal and reference voltages. Since the field of view rotates at twice the rotational speed of the prism 131, the error signal has a frequency twice that of the prism rotation. This is advantageous in eliminating noise of mechanical origin from the error signal thusly obtained.

It is to be noted that a system which develops an error signal directly in terms of polar coordinates has distinct advantages (aside from the smaller amount of equipment required) over one which measures image displacements in two perpendicular directions. In the latter type of system any non-linearity in the relation of signal to displacement makes it impossible to infer the true direction of the displacement. If, for example, the two components of displacement are each so large that square wave signals of maximum amplitude are obtained, the displacement appears to be in a direction bisecting the perpendicular reference directions. In the system proposed herein, any non-linearity affects only the ratio of signal to total displacement while the phase difference between signal and reference voltages continues to give a true indication of the direction of the displaced image.

*Torque relations between the stable element and the gimbal system*

In Figs. 1, 4 and 6 the stable element is represented by the cubical box. For convenience in referring to the various directions in the stable elements, a system of mutually prependicular units vectors $u_1$ $u_2$, $u_3$ may be imagined fixed in the stable element as illustrated in Fig. 2. Considering first the method of obtaining resistance to a torque about $u_1$ only, assume the gyroscope 22 is mounted in the element 11 with the gyro case pivoted about an axis parallel to $u_2$, this axis being referred to as the pivot axis of the gyro 22. The gyro case is indicated as an openframe with its pivot axis parallel to $u_2$, and with bearings perpendicular to the pivot axis which support the gyro rotor. Before the application of the torque to the stable element, the spin axis is assumed to be in its "normal" position parallel to $u_3$. Since only the directions of the various axes are being considered now, it becomes convenient to consider that the pivot axis of gyro 22 is the vector $u_2$ and that the normal position of the spin axis of gyro 22 is the vector $u_3$. If the torque is now applied to the stable element about the axis $u_1$; the gyro precesses about its pivot axis, and as long as this precession continues the torque will be resisted without any rotation of the stable element occurring. The rate of precession of the gyro 22 is proportional to the torque so that a greater torque merely precesses the gyro at a greater rate. A steady torque about $u_1$ could not be resisted indefinitely in this way, since eventually the spin axis would align itself with $u_1$ and all rigidity about this axis would disappear. Torques in alternating directions about $u_1$, however, will precess the gyro first in one direction and then in the other so that it never departs far from its normal position. Even very great torques of this nature can be completely resisted. The single gyro described, offers no resistance whatever to a torque about $u_2$, such a torque simply producing a rotation of the box about $u_2$, while leaving the spin axis of gyro 22 in a fixed direction in space. A torque about $u_3$ would also be unresisted if the gyro were in its normal position, since the box and the gyro case would simply rotate about the spin axis of the gyro. For the purpose of resisting a torque about $u_2$, a second gyro 23 is mounted in the stable element 11, the pivot axis being parallel to $u_3$, and the spin axis being normally parallel to $u_1$. The preceding description of the action of gyro 22 applies equally well to gyro 23. Also, in exactly the same manner, the gyro 21 is provided to resist the torque about $u_3$. It is clear that each gyro resists the torque about only one axis so that torques can be applied to the three axes simultaneously and each gyro acts individually in the manner just described. However, torques applied simultaneously about all three axes are equivalent to a single torque applied about an axis having a arbitrary direction in the stable element.

The configuration of gyros that has been described is therefore capable of resisting, for limited periods of time, a disturbing torque of any magnitude about an axis having an arbitrary direction with respect to the stable element. The greater the magnitude of such a torque, the shorter is the period of time that it can be resisted before one of the gyros precesses into such a position that it no longer is able to resist its proper component of torque. Considering the case where the disturbing torque is about $u_1$ and is resisted by the gyro 22, it is clear that the existence of a precessional motion of gyro 22 about its pivot axis is evidence that the gyro is being called upon to resist some disturbing torque and therefore this precessional motion is used to bring into action a corrective torque which will oppose the disturbing torque. Thusly, for every disturbing torque applied, a corrective torque about $u_1$ is created whenever a precessional motion of gyro 22 indicates the need for it. The corrective torque is applied by external torquers in such a sense as to precess the spin axis back toward its normal position. It would be theoretically impossible to perform this task with such perfection that the gyro never left its normal position since there would then be no displacement of the gyro to indicate the need for a corrective torque, the corrective torque always being instantaneously exactly opposite to the disturbing torque. Inasmuch as the precessional rate of the gyro is proportional to the disturbing torque, the corrective torque need not return the gyro to its normal position but is required only to reduce the rate of precession to zero. If this be accomplished, the corrective torque will completely neutralize the disturbing torque, even though the gyro is not in its normal position. This can be achieved by making the corrective torque proportional to the displacement of the spin axis from its normal position and of such a sense as to precess the gyro towards its normal position if the corrective torque were acting alone. In the event that a constant disturbing torque is suddenly applied to the stable element when the gyro is in its normal position, the gyro will start to precess about its pivot axis at a rate proportional to the disturbing torque; but as soon as it has moved away from its normal position, the corrective torque will be applied in such a way as to neutralize part of the disturbing torque and the precessional rate will decrease. This process will continue, the displacement increasing, but more and more slowly, until the corrective torque has attained such a magnitude as to neutralize completely the disturbing torque and the displacement will then remain constant. The sudden removal of the disturbing torque will leave the corrective torque to precess the gyro back toward its normal position in exactly the same manner as the disturbing torque originally precessed it away from that normal position. As the gyro approaches its normal position the corrective torque will diminish and the rate of approach to the normal position will decrease. Finally the gyro will return to its normal position and the corrective torque will vanish. This relation between the position of the gyro spin axis and the magnitude and sense of the corrective direction therefore has the effect of keeping the gyro centered at its normal position when no disturbing torque is acting.

From the symmetry of the form of the stable element, this description applies equally well to the other two gyros acting individually and to all three gyros acting simultaneously. The total corrective torque applied to the stable element will have such a direction and magnitude that its components in the directions $u_1$, $u_2$, $u_3$, will be equal to the angular displacements of the three gyros 22, 23, 21 about their pivot axes $u_2$, $u_3$, $u_1$, these displacements being counted from the normal positions in which the spin axes are in the directions of $u_3$, $u_1$, $u_2$. In order to obtain a signal for controlling the corrective torque the pivot axis of each of the gyros 22, 23, 21 has been provided with pick-offs 25, 26 and 24 respectively, which produces a signal in the form of an alternating voltage of magnitude proportional to the displacement and of phase the same as, or opposite to, the phase of some reference voltage depending on the sense of the displacement. These three signals therefore specify completely the required corrective torque. The gimbal system heretofore considered necessary only for supporting the stable element 11 and allowing it the required freedom of motion, becomes available, by the addition of appropriate torque motors, for the automatic application of corrective torques to the stable elements 11. The gimbal system of the stable element 11, illustrated in Fig. 1, may be considered as having a unit vector $u_4$ in the direction of the axis 17—17; unit vector $u_5$ in the direction of axis 16—16; and a unit vector $u_6$ in the direction of axis 18—18. The unit vectors $u_1$, $u_2$, $u_3$, introduced hereinbefore may be considered as being oriented in the stable element with $u_1$ in the direction of the normal $\gamma$, $u_2$ in the equatorial plane and 90° away from $u_1$ and $u_3$ along the polar axis in the direction of the axis 15—15. Inasmuch as right ascension $\alpha$ is to be introduced by a servo at the bearing 15′ so that the stable element 11 is effectively clamped in the gimbal ring 12 as long as a single star is under observation, it is therefore not possible to apply a corrective torque between the stable element 11 and the gimbal ring 12. The axes 18—18; 16—16; 17—17 are free to rotate in their bearings, however these being the axes that give the stable element 11 its required three degrees of freedom. Torquer 18′ may be mounted on the axis 18 and will apply a torque, upon actuation, to the shaft 18; another torquer 17′ at one bearing of the shaft 17 is capable of applying a torque between the two members of this bearing; and the third torquer at 16′ is capable of applying a torque between the two members of this bearing. The torque developed by the torquer at 18′ can be expressed in the vector form $M_6u_6$, that developed by the torquer at 17′ in the form $M_4u_4$, and that developed by the torquer at 16′ in the form $M_5u_5$. In these expressions each of the scalar multipliers $M_4$, $M_5$, $M_6$, represents the magnitude and sense of the torque developed by one of the three torquers, and signals which energize the torquers must therefore have magnitudes proportional to these quantities. The torque in the stable element resulting from the action of the torquers is $$M = M_4u_4 + M_5u_5 + (M_6 \sec \gamma - M_5 \tan \gamma)(u_4 \times u_5)$$

If M is the resultant torque on the stable element M may be expressed in the form $$M = M_1u_1 + M_2u_2 + M_3u_3$$

where the multipliers $M_1$, $M_2$, $M_3$ are the components of the desired corrective torque about the unit vectors fixed in the stable element 11. According to previous explanations these multipliers are proportional to the displacements of the three gyros about their pivot axes, and corresponding voltages are available from the pivot axis pick-offs. It is required then, to express $M_4$, $M_5$, $M_6$ in terms of $M_1$, $M_2$, $M_3$. For this purpose let $\beta$ and $\gamma$ be the angles measured at the bearings 16′ and 17′ respectively, both angles being counted as zero when axis 15—15 has the same direction as axis 18—18. The positive direction of $\beta$ is taken as counter-clockwise when viewed in the direction of $u_5$ and the positive direction of $\gamma$ is taken as clockwise when viewed in the direction of $u_4$. With these conventions the angles indicated in Figs. 1 and 14 illustrate the relations between the two sets of unit vectors. From these relations, the following values of $M_4$, $M_5$ and $M_6$ are obtainable:

$M = (+M_1 \cos \alpha + M_2 \sin \alpha) \cos \beta - M_3 \sin \beta$
$M_5 = (-M_1 \sin \alpha + M_2 \cos \alpha)$
$M_6 = [(+M_1 \cos \alpha + M_2 \sin \alpha) \sin \beta + M_3 \cos \beta] \cos \gamma + M_5 \sin \gamma$ Except for the omission of the same factor of proportionality in all three equations, these equations may be interpreted as expressing the required torque motor voltages $M_4$, $M_5$, $M_6$ in terms of pick-off signals $M_1$, $M_2$ and $M_3$.

Figure 8:
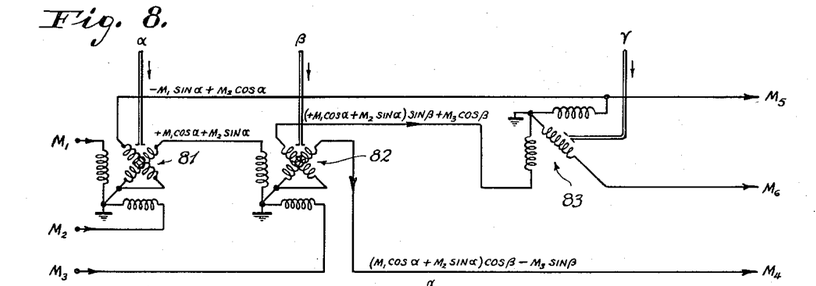
Fig. 8 is a schematic diagram of the circuit for the control of the external torque motors.

Fig. 8 is a diagram of a circuit producing the relations specified by the foregoing equations. The circuit employs electric resolvers 81, 82 and 83 rotated in accordance with values of the angles $\alpha$, $\beta$, $\gamma$ respectively. The input signals $M_1$, $M_2$ and $M_3$ are proportional respectively to the outputs from pick-offs 25, 26 and 24, and are transformed by that circuit to produce output voltages for the torque motors at 17', 16' and 18'. Any discrepancy between the torque called for by the pivot axis pick-offs and that supplied by the torque motors simply acts as another disturbing torque which will eventually be neutralized by the torque motors if the above equations are only approximately realized in the electric circuits employed.

*Torque relation between the star follower and the stable element*

In order to derive the equations presenting the required relationship between the error signal from the star follower and the energizing voltages for the internal torquers of the stable element, it will be convenient to revert to the first description offered herein of the telescope in which a mask rotates in a stationary field of view, although an exactly similar signal is obtained from the type of telescope employing a rotating field of view. Let $v_1$, $v_2$, $v_3$ be three mutually perpendicular unit vectors fixed in the telescope, $v_1$ being in the directions of the optical axis 123—123 and $v_2$ being in the direction of the axis 65—65 of the telescope. It will be seen that $v_2$ is also parallel to the equatorial plane of the stable element 11. Fig. 15 illustrates the orientation of the $v_1$, $v_2$, $v_3$ vectors relative to the vectors $u_1$, $u_2$, $u_3$ contained in the stable element 11 when the telescope is adjusted for observation of a star having right ascension $\alpha$ and declination $\delta$. Assuming that the two sets of vectors maintain a fixed relative orientation as they do when a single star is being observed, but that both sets depart from their correct orientation in space, this departure is equivalent to a rotation of all the vectors of Fig. 15 about some line, and if the rotation is small, may be represented by a vector along this line. The component of the vector in the direction of $v_1$ represents a rotation about the optical axis 123—123 of the telescope and has no effect in displacing the star image from the center of the focal plane. The remaining component perpendicular to $v_1$ and therefore in the plane of $v_2$ and $v_3$ represents a rotation of the telescope about a line in its focal plane and produces a displacement of the star image in a direction perpendicular to this line. A component of the total displacement perpendicular to the optical axis 123—123 will be denoted by an error vector $\epsilon$ and it will be shown that the phototube error signal determines the components of $\epsilon$ in the $v_2$ and $v_3$ directions. Let $\epsilon$ represent the magnitude of the error vector $\epsilon$ and let $\psi$ the angle between $\epsilon$ and $v_2$ as measured in the direction from $v_2$ toward $v_3$. Then the displacement of the star image from the center of the focal plane will be proportional to $\epsilon$ and, if it is assumed that the displacement is small, the amplitude of the phototube error signal will also be proportional to $\epsilon$. By a proper setting of the reference generator, the phase angle of the error signal voltage will be equal to $\psi$. If $\epsilon$ is expressed in the form $\epsilon = \epsilon_2 v_2 + \epsilon_3 v_3$ then $\epsilon$ and $\psi$ determine $\epsilon_2$ and $\epsilon_3$ through the relations $\epsilon_2 = \epsilon \cos \psi$ and $\epsilon_3 = \epsilon \sin \psi$. It will be supposed that an electrical circuit is available which has the phototube error signal and the reference voltage as inputs, and voltages $\epsilon_2$ and $\epsilon_3$ satisfying the relations above as outputs. These outputs are to have the frequency and phase of the reference voltage and amplitudes $\epsilon_2$ and $\epsilon_3$ respectively. From these relationships the following equations may be derived:

$\sigma_1 = -\epsilon_2 \sin \alpha - \epsilon_3 \sin \delta \cos \alpha$
$\sigma_2 = +\epsilon_2 \cos \alpha - \epsilon_3 \sin \delta \sin \alpha$
$\sigma_3 = +\epsilon_3 \cos \delta$ These three quantities are the components of $\epsilon$ in the directions of $u_1$, $u_2$, $u_3$. If the three internal torque motors 27, 28 and 29 are energized with voltages proportional to the negatives of these values the resulting angular velocity of the stable element will be proportional to $-\epsilon$. The error vector $\epsilon$ will therefore approach zero exponentially and the optical axis 123—123 of the telescope will tend toward coincidence with the observed star.

Figure 9:
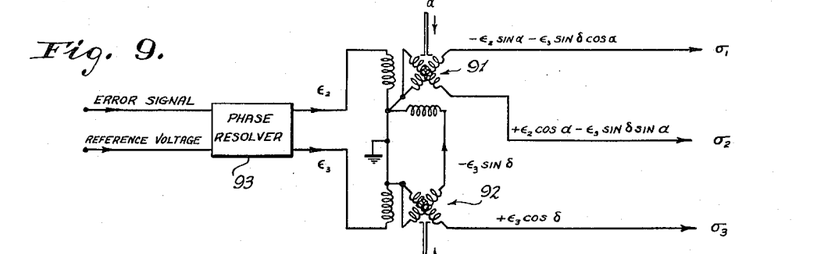
Fig. 9 is a schematic diagram of the circuit for the control of the internal torque motors.
Figure 10:
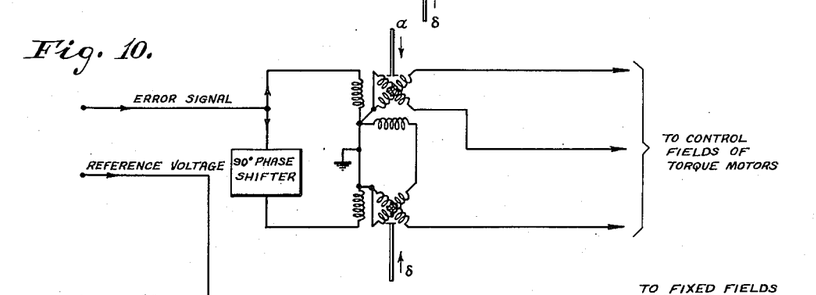
Fig. 10 is a schematic diagram of an alternative circuit for the control of the internal torque motors.

Fig. 9 is a diagram of one acceptable circuit for producing the torquer voltages specified in the above equations. The two resolvers 91 and 92 are rotated in the angles $\alpha$ and $\delta$ and may be mounted on the same shafts as the transmitter synchros used for setting the coordinates of the selected star. The use of two-phase internal torquers would allow the phase resolver 93 to be replaced with a much simpler circuit which simply shifts the phase of the error signal by 90° (Fig. 10). This is a consequence of the fact that a properly designed two-phase torquer is insensitive to any component of the control field excitation which is in phase with the fixed field excitation. This characteristic is similar to the phase discrimination of the phase resolver of Fig. 9 and can be used to eliminate the need of the phase resolver. The fixed fields of the torquers must in this case be excited by the voltage of the reference generator. Fig. 10 is a diagram of an alternative circuit which makes use of this property of the torquers.

Heretofore no mention has been made of the overall gain of the circuits between the phototube and the torque motors. This gain affects the ratio of angular displacement of the optical axis to angular rate of the stable element, the ratio being the time constant of the exponential decrease of the error.

It has also been assumed that the error signal is proportional to the displacement, while in practice the error signal will approach some limiting value for large displacements. This will have the effect of making the rate of decrease of error almost constant when the error is large, with the rate becoming exponential as the error approaches zero. It will be recalled that the error signal contains no information relative to a rotation of the stable element and telescope about the optical axis. Corresponding to this fact, the corrective angular rate produced by the circuits of Figs. 9 and 10 contains no component along the optical axis. Any stable element drift consisting of rotation about the line of sight to a single star therefore remains uncorrected by observations of that star and can be removed only by observing a second star in a different direction. Hence celestial observations, even though employed for monitoring purposes only, must employ two stars.

*Operation of the leveling system*

Conventional methods of determining the vertical in a craft depend on observations of the effect of gravitational forces on some test mass carried in the craft. This mass is usually in the form of a pendulum or liquid in a level, but for some purposes it is more convenient to image that the test mass is a mass particle which is rigidly attached to the craft in such a manner as to permit the measurement of the magnitude and direction of the force which constrains it to the craft. In this way it is possible to avoid considerations of relative motion that occurs between the test mass and the craft itself. This motion, which is exemplified by the swinging of a pendulum or the surging of the liquid in a level, may be taken into account, but its inclusion tends to obscure the more fundamental aspects of the problem. If the craft is stationary on the surface of the earth, the constraining force is vertical. However, if the craft undergoes any linear acceleration, the test mass must experience the same acceleration and the constraining force is no longer due to gravity alone but includes the force necessary to accelerate the test mass. No matter what gravitational force is acting, it is possible to produce any prescribed total force by imposing a suitable acceleration on the craft so that it becomes impossible to distinguish, instantaneously, between the force due to gravity and that due to acceleration. The determination of a gravity vertical in a craft is possible when the craft accelerations are largely of a random nature and change sign so rapidly that it is possible to eliminate their effects by an averaging or smoothing process.

Figure 3:
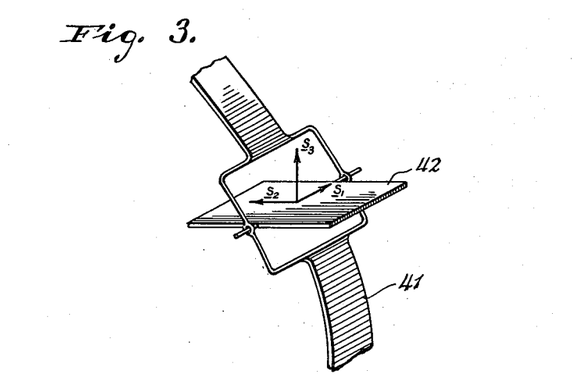
Fig. 3 illustrates the orientation of certain unit vectors on the horizontal platform.

In the following paragraphs, it will be necessary to refer to three different directions related to the vertical, and it becomes necessary to define three unit vectors in these directions. The first is the direction of the true vertical at the location of the craft, and the unit vector in this direction is denoted by $h$. This direction is normal to the spheroidal surface of the earth and is the direction assumed by a plumb line whose point of support is fixed to the earth. It is also the direction of the force constraining the test mass to the craft when the craft is stationary on the earth. The second vector is denoted by $k$ and is in the direction of the dynamic vertical. This is defined as the direction of the force constraining the test mass to the craft when the craft is in motion. The third unit vector $s_3$ is in the direction of the indicated vertical and is obtained by subjecting the vector $k$ to a smoothing process and making corrections for certain systematic effects to be described shortly. It is this direction which is regarded as the best approximation to the true vertical which can be obtained in a craft in motion. From Fig. 4, it is evident that in this system the vector $s_3$ is normal to the plane of platform 42. It will also be convenient to imagine two other unit vectors fixed to the platform 42, $s_1$ in the direction of the axis 43—43 and $s_2$ in the plane of the platform 42 perpendicular to 43—43 as in Fig. 3. When the platform is properly oriented, $s_1$ is directed toward the East, $s_2$ toward the North, and $s_3$ toward the true vertical.

First, it will be supposed that the craft is stationary on the surface of the earth so that the dynamic vertical $k$ coincides with the true vertical $h$. Furthermore, since the ultimate accuracy of the vertical determination depends on the behavior of the system when the indicated vertical is close to the true vertical, it will be assumed that the direction of $s_3$ is nearly the same as that of $h$. The departure of $s_3$ from $h$ can therefore be represented by a rotation vector $m = m_1 s_1 + m_2 s_2$ in the sense that rotations through small angles $-m_1$ and $-m_2$ about $s_1$ and $s_2$, respectively, would bring $s_3$ into coincidence with $h$. If the levels are first thought of as producing signals equal to those that could theoretically be obtained from a test particle, it is clear that a signal $m_1$ can be obtained from the latitude level and a signal $m_2$ from the longitude level. Since the departure of $s_3$ from the true vertical is specified by the vector $m = m_1 s_1 + m_2 s_2$ and since $m_1$ and $m_2$ can be obtained from the levels, the error $m$ can be removed exponentially by producing an angular rate of the platform, measured with respect to the earth, proportional to $-m$. In terms of the components of $m$, the required angular rate of the platform about $s_1$, is $-m_1/T$, and the angular rate about $s_2$, is $-m_2/T$, where T is a factor of proportionality described as the integrator time constant. The first condition is satisfied by using the signal $m_1$ as the input to an integrator whose output rotates the platform about $s_1$, at an angular rate $-m_1/T$. The second condition is not as easily satisfied because the method of supporting the platform does not directly allow a rotation about $s_2$ and, therefore, it is necessary to produce the required angular rate by a suitably adjusted rate about $u_3$. Since the angle between $u_3$ and $s_2$ is the latitude $\phi$, a rotation about $u_3$ must take place with angular rate $-m_2 \sec \phi/T$ to produce an angular rate $-m_2/T$ about $s_2$. The signal $m_2$ should, therefore, be multiplied by $\sec \phi$ before being used as the input to the motor 47. In order to avoid unduly complicating Fig. 4, this multiplication was not indicated. Its omission would have little effect at moderate latitudes but would result in sluggish levelling of the platform about a North-South axis when near the Poles. Throughout this discussion, the angular errors that have been mentioned are measured with respect to the true vertical. The corrective angular rates should therefore be referred to the true vertical (i. e., relative to the earth) rather than to the stable element which does not rotate with the earth. This condition is satisfied by introducing the angular rate of the earth as the clock rotation (48) indicated in Fig. 4.

The smoothing properties of this system will be recognized by assuming that the craft is subject to random accelerations of such a nature that its average position is fixed with respect to the earth. Under these conditions the dynamic vertical oscillates about the true vertical while the indicated vertical always approaches the dynamic vertical at a rate proportional to its departure from it. If T is small, the angular rates of the platform will be large, and the indicated vertical will follow the dynamic vertical rather closely. On the other hand, if T is large, the indicated vertical will remain close to the average position of the dynamic vertical (i. e., in this case close to the true vertical).

As the craft moves over the surface of the earth, the direction of the indicated vertical must change if it is to remain in coincidence with the true vertical. The angular rates producing this change must be supplied by the integrators and, with the system so far described the integrators can supply these rates only if the indicated vertical departs from the true vertical. The required departure would depend on the speed of the craft and the time constant of the integration effect achieved by means of motors 47 and 143, larger values of both of these quantities requiring a larger error to produce the necessary rates. In order to obtain the effective smoothing produced by a large value of T without introducing this error, it is intended to compute the angular rates necessary to account for the motion of the craft and to introduce them as corrections to the integrator inputs. In order to describe these corrections let V be the ground speed vector of the craft, V its magnitude, and A represent the course angle of its ground track. It will be supposed that values of V and A are available in the craft, being obtainable from instruments well known in the art. The required angular rate of the indicated vertical is then $V/R$ where R is the radius of the earth. This angular rate should take place about a line in the horizontal plane perpendicular to the ground track of the craft. The components of this rate are therefore $-(V/R) \cos A$ about $s_1$ and $+(V/R) \sin A$ about $s_2$, the course angle being measured from the North toward the East. It has been seen that level signals $m_1$ and $m_2$ produce angular rates $-m_1/T$ about $s_1$ and $-m_2/T$ about $s_2$. The additional angular rates can therefore be obtained by adding the quantity $+(VT/R) \cos A$ to $m_1$ and the quantity $-(VT/R) \sin A$ to $m_2$. Although these quantities are added to the error signals obtained from the levels 44 and 45, the velocity of the aircraft does not cause a departure of the dynamic vertical from the true vertical. The corrections should therefore be regarded not as corrections to the error signals but as integrator input corrections necessary to avoid the error which would otherwise be introduced by the smoothing process.

In addition to the random accelerations which the craft experiences, there are persistent accelerations which affect the vertical indication unless appropriate corrections are made for them. It will be seen that the acceleration corrections necessary to remove this error are added to the level signals in the same manner as the velocity corrections just described, although it is important to realize that the corrections are of an entirely different nature. The persistent accelerations of the craft cause a departure of the dynamic vertical from the true vertical. The acceleration correction consists of computing the two components of this departure and subtracting them from the level signals. The average values of the modified signals are then zero, and they produce no change in the indicated vertical as a result of the persistent accelerations of the craft. The acceleration corrections will be found to depend on the acceleration of gravity, $g$, indicating their relationship to the level signals. On the other hand, the velocity corrections are independent of $g$ but contain the time constant T associated with the smoothing process.

Figure 7:
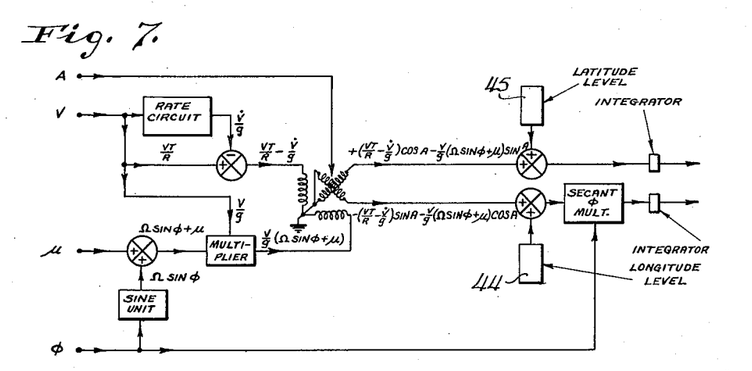
Fig. 7 is a schematic diagram of the levelling circuits including velocity and acceleration corrections.

Illustrated in Fig. 7 are the components necessary to produce the velocity and acceleration corrections. The inputs which are theoretically required (though not demonstrated herein) in order that this system will produce the proper velocity and acceleration corrections are the latitude $\phi$, and the ground speed V of the craft, the course angle A, and rate of turn $\mu$ of its ground track. The latitude will be obtained from the output of the position indicator 144. It is intended to use approximate values of the other three inputs. In aircraft, the true air speed would be used instead of ground speed, aircraft heading being used instead of course angle, and rate of turn of the aircraft instead of rate of turn of the ground track. These approximations are in error only as a result of wind. The neglect of wind is quite inappreciable in the computation of the velocity corrections and, under ordinary conditions, is only slightly more serious in the case of the acceleration corrections but these have not been found excessive in practice.

*Automatic course control*

Figure 11:
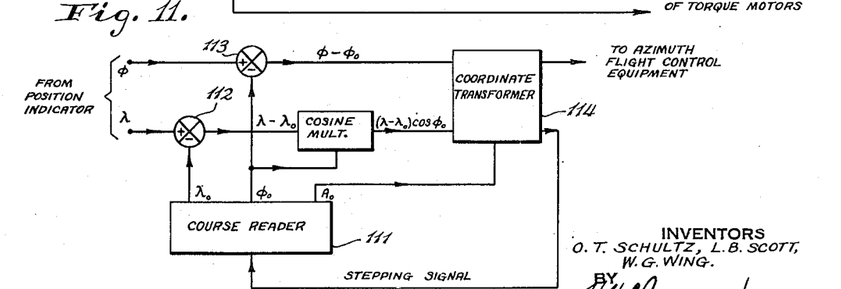
Fig. 11 is a block diagram of an automatic guidance equipment.

The apparatus described heretofore produces continuous indications, on dials or counters, of the latitude and longitude of the craft. Such a device may be used without additional equipment in piloted craft, but additional equipment is needed to control the course of a craft, automatically, toward an objective of known latitude and longitude. Fig. 11 is a block diagram of the equipment proposed to perform this function. The principal unit indicated in the diagram is a "course reader" 111. This unit contains a record of data pertaining to the ground track that the craft is intended to follow. The data obtained from this unit must necessarily be very precise but, in order to avoid the need of maintaining close tolerances in producing the record, it becomes desirable to employ some method of digital recording. The desired ground track is represented by a discrete series of reference points connected by great circular arcs, the separation of consecutive reference points being for example about ten miles. The data pertaining to each point could be punched on a tape, each line of data on the tape representing the latitude and longitude of the reference point and the course angle of the arc from that point to the next. These three quantities are designated as $\phi_0$, $\lambda_0$, and $A_0$ in Fig. 11. Let $\phi$ and $\lambda$ represent the craft's actual latitude and longitude obtained from the position indicators 144 and 141, respectively. The diagram illustrates differentials 113 and 112 which form the differences $\phi - \phi_0$ and $\lambda - \lambda_0$. The difference in latitude, $\phi - \phi_0$, may be interpreted as the craft's distance in miles north of the reference point. The longitude difference is multiplied by cos $\phi_0$ and the product, $(\lambda - \lambda_0)$ cos $\phi_0$ may be interpreted as the craft's distance in miles west of the reference point. These two distances, together with the course angle $A_0$, enter the "coordinate transformer" 114, and the outputs of this unit are the component distances from the reference point to the craft, measured along and perpendicular to the great circular arc joining consecutive reference points. The perpendicular component of distance is to be transmitted to the automatic pilot where it will produce a turn of such sense as to turn the craft toward the intended ground track. The component of distance along the ground track is used only intermittently. When it attains a value of ten miles, or whatever distance between reference points has been adopted, it generates a "stepping signal" which may be made to pull the tape to a new line of data representing the next reference point on the intended ground track.

Up to this time, little attention has been given to the problem of converting the perpendicular component of distance into a turn signal suitable for controlling the heading of the craft, but this problem appears to be essentially the same as that encountered in aircraft blind landing equipment, where the aircraft must also fly a prescribed ground track and in which art appear many solutions to this problem.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a craft guidance system, a space-stabilized element, supporting means arranged to provide said element with complete rotational freedom and including a member defining an axis of rotation parallel to the earth's axis of rotation, a pivotable member mounted on said axis defining member and pivotable about said axis of rotation, and a servomechanism responsive to the attitude of said pivotable member for maintaining said pivotable member in a vertical plane relative to the earth.

2. In a guidance system, an element fixedly oriented in space having a member defining an axis parallel to the earth's axis of rotation, means mounting said element with three degrees of rotational freedom, a member rotatably mounted on said axis defining member, and a servomechanism responsive to the attitude of said rotatable member for maintaining said rotatable member in a vertical plane.

3. In a craft guidance system, an element fixedly oriented in space having a member defining an axis parallel to the earth's axis of rotation, means mounting said element with three degrees of rotational freedom relative to the craft, a member rotatably mounted on said axis defining member, means responsive to the attitude of said rotatable member for maintaining said rotatable member in a vertical plane, and positionable means on said rotatable member for defining a horizontal plane.

4. In a guidance system, an element fixedly oriented in space, mounting means including a gimbal system providing said element with three degrees of rotational freedom, said mounting means further providing a member defining an axis parallel to the earth's axis of rotation, a pivotable member mounted on said axis-defining member to be rotatable about said axis, a pivotable platform mounted on said pivotable member, and means for maintaining said platform in a horizontal plane.

5. In a guidance system, an element fixedly oriented in space, means mounting said element to have three degrees of rotational freedom, said mounting means including a member defining an axis parallel to the earth's axis of rotation, an element mounted to be pivotable on said axis defining member, a positionable platform on said element, and means for maintaining said positionable platform in a horizontal plane.

6. A guidance system comprising, means defining a space-stabilized element, supporting means providing said element complete rotational freedom, a pivotable element mounted on said supporting means, means maintaining said pivotal element parallel to the local meridian, said pivotable element having a horizontal defining means thereon, and a means for applying rotation to said pivotable element corresponding to earth's rate.

7. A guidance system comprising, means defining a space-stabilized element, supporting means providing said element complete rotational freedom and including a member defining an axis parallel to the earth's axis of rotation, pivotable means on said axis defining member for defining a plane representing the local meridian and including a horizontal seeking device pivoted thereon, torque means responsive to the attitude of the horizontal seeking device for maintaining said pivotable means in a vertical plane relative to the earth, and means for differentially applying a rotation to said pivotable means corresponding to earth's rate.

8. In a navigation system having a space-stabilized element capable of resisting torques about any axis whatever without change in orientation, a system arranged to mount said element with three degrees of rotational freedom, a pivotable member, means mounted on the space-stabilized element for providing an axis of rotation for said pivotable member, said axis being parallel to the earth's axis of rotation, gravity sensitive devices mounted on said pivotable member, and a servomechanism responsive to said gravity sensitive devices for maintaining said pivotable member in a vertical plane with respect to the earth.

9. In a craft navigation system, a space-stabilized element having monitoring means for maintaining the element fixedly oriented in space, mounting means providing said element with rotational freedom relative to the craft, means associated with said mounting means and pivotable about an axis parallel to the earth's axis of rotation, said pivotable means having a vertical determining device, and a pair of signal producing means supported by said vertical determining device and each having an output, one being responsive to craft longitude as measured by the rotation of said pivotable means about said earth's paralleling axis, and the other being responsive to craft latitude as measured by the rotation of said vertical determining device relative to said pivotable means.

10. In a navigation device, means providing a space-stabilized element, mounting means for said element including a member defining an axis of support parallel to the earth's axis of rotation, means defining a plane including the local earth's meridian and pivotable on said member, signal producing means supported by said pivotable means and having a signal output responsive to rotation of said plane relative to said axis of support, means establishing a horizontal plane on said meridian plane, and signal producing means mounted on said horizontal means and responsive to rotation of said horizontal plane relative to said meridian plane.

11. In a navigational device, a space-stabilized element, mounting means providing complete freedom of rotation for said element including a member defining an axis parallel to the earth's axis of rotation, means pivotable on said member and positionable to define a plane including an earth's meridian, a horizontal determining means mounted on said pivotable means, means supported by said horizontal determining means for producing a first signal output in accordance with lateral deviations of said pivotable means from a vertical plane, means supported by said horizontal determining means for producing a second signal output in accordance with deviations of said horizontal determining means from horizontal, torque producing means responsive to said second signal for maintaining said horizontal determining means horizontal, torque producing means responsive to said first signal for maintaining said pivotable means in a vertical plane, and constant speed means for rotating said pivotable means at the speed of the rotation of the earth.

12. In a navigational device having a stable element, mounting means providing said element with complete rotational freedom and including a member defining an axis of support parallel to the earth's axis of rotation, means positionable in rotation about said member to define a plane including the local meridian, means on said positionable means defining a horizontal plane, a first signal producing means having an output responsive to rotation of said positionable means off vertical, a second signal producing means having an output responsive to rotation of said horizontal plane defining means relative to said axis defining member, torque producing means responsive to said first signal for maintaining said positionable means in a vertical plane, and torque producing means responsive to said second signal for maintaining said horizontal defining means in a horizontal plane.

13. In a navigational device having a stable element, mounting means providing said element with three degrees of rotational freedom, said mounting means including a member defining an axis of support parallel to the earth's axis of rotation, a meridian ring pivotably mounted to be rotatable about said axis defining member, a gravity sensitive element supported by said meridian ring and torque means responsive thereto for maintaining said meridian ring in a vertical plane, a platform pivotably mounted on said meridian ring, a gravity sensitive element mounted on said platform and torque means responsive thereto for maintaining said platform in a horizontal plane, means responsive to rotation of said meridian ring about said stable element for providing an indication of longitude, and means responsive to rotation of said horizontal platform relative to said meridian ring for providing an indication of latitude.

14. A guidance system comprising a space-stabilized element having means for resisting torques about any axis, mounting means providing said element with rotational freedom, monitoring means including a star follower positioned in space by said stabilized element and productive of signals upon departure of said follower from a line including a preselected celestial object, and means responsive to said signals for orienting said element.

15. In a guidance system, an element having means to resist torques about any axis and having mounting means to provide said element with complete rotational freedom, means maintaining said element substantially fixedly oriented in space, monitoring means establishing a fixed line in space for controlling the operation of said last-recited means, and means coupling said monitoring means to be positioned by said element.

16. In a guidance system, means resisting torques about any axis, means establishing a line in space, said line including a preselected celestial object, coupling means coordinating the orientation of said line establishing means with said torque resisting element, and means responsive to drift of said torque resisting means relative to said line for reorienting said torque resisting means.

17. In a guidance system, a space stabilized element having means to resist torques about any axis, means defining a line including a preselected celestial object, means coupling said line defining means to said element, means producing signals upon any deviation of said line from said object, and means responsive to said signals for maintaining said space-stabilized element in fixed orientation relative to said object.

18. In a guidance system, a space-stabilized element having means to resist torques about any axis, a line defining means mounted to be positioned by said element, means producing signals responsive to deviations of said line from a predetermined orientation in space, and means coercing said element in response to said signals in a sense to eliminate said deviations.

19. In a guidance system, an element having mounting means to provide said element with complete rotational freedom and mounting a plurality of gyroscopes arranged to provide stability about any axis, coercing means for positioning each of said gyroscopes, a line defining means adapted to be aligned with a predetermined celestial body by said element, signal producing means responsive to deviations of said line defining means from alignment with said celestial body, and means applying said produced signals to said coercing means in a sense to overcome said deviations.

20. In a guidance system, a stable element having mounting means to provide said element with complete rotational freedom and including a plurality of gyroscopes arranged to provide stability about any axis, each gyroscope having torque means, a monitoring means for said stable element and stabilized thereby including a star follower, means producing signals upon departure of said star follower from a line including a predetermined celestial object, and circuit means applying said signals to said torque means to maintain said stable element in a predetermined orientation with said line.

21. In a guidance system, an element having mounting means to provide said element with complete rotational freedom and mounting a plurality of gyroscopes arranged to provide stability about any axis, each gyroscope having torque means for orienting said element, a line defining means positioned by said element to remain substantially fixedly oriented in space in alignment with a predetermined celestial body, signal means responsive to deviation of said line defining means relative to said celestial body, and means responsive to said signals for activating said torque means and thereby repositioning said element to maintain the predetermined orientation relative to said celestial body.

22. In a guidance system, an element having mounting means to provide said element with complete rotational freedom, means stabilizing said element in space against torques about any axis including a plurality of gyroscopes each having torque means, a star follower mounted to be positioned in accordance with the position of said element, signal producing means for said star follower and responsive to deviations from a predetermined celestial line, and means supplying said signals to activate said torque means in a sense to cause said element to be monitored by said star follower.

23. In a guidance system, a space-stabilized element having mounting means to provide said element with complete rotational freedom and having means to resist torques about any axis, a star follower mounted to be positioned by said space-stabilized element, means for producing a signal responsive to deviation of said star follower from a predetermined celestial orientation, means for coercing said space-stabilized element, and means for operating said coercing means by the signal of said signal producing means to restore said star follower to its predetermined celestial orientation.

24. In a guidance system, a reference member, means mounting said member to have three degrees of rotational freedom and including three gimbal members each containing two mutually perpendicular axes, a positionable member having means for detecting radiant energy from a celestial body, means mounting said positionable member to have three degrees of rotational freedom and including two gimbal members each having two mutually perpendicular axes, one of said reference member gimbals and one of said positionable member gimbals being interconnected to remain in parallel planes, said other positionable member gimbal having means positioning same in accordance with the position of another of said reference member gimbals, means interconnecting said positionable member and the remaining of said reference member gimbals for orienting said positionable member in accordance with the position of said remaining reference member gimbal, and means responsive to the radiant energy detected by said positionable member for maintaining said reference member substantially fixedly oriented in space.

25. In the combination set forth in claim 24, means interposing signals to cause said other positionable member gimbal to deviate by a predetermined amount from parallel alignment with its corresponding reference member gimbal.

26. In a guidance system, a reference member having means to resist torques about any axis, mounting means providing said member with three degrees of rotational freedom, a positionable element having means for detecting radiant energy from a celestial body, means mounting said element with three degrees of rotational freedom about axes bearing a predetermined relation with the respective axes of said first mounting means, means stabilizing said element relative to said reference member, and means responsive to the radiant energy detected by said positionable element for maintaining said reference member substantially fixedly oriented in space.

27. In a guidance system, a reference member having means to resist torques about any axis, mounting means providing said member with three degrees of rotational freedom, a positionable member having means for detecting radiant energy from a celestial body, means mounting said positionable member with three degrees of rotational freedom, means interconnecting said reference member and said positionable member to stabilize one with respect to another, means differentially causing said positionable member to deviate from a predetermined relation relative to said reference member position, and means responsive to the energy detected by said positionable element for maintaining said reference member substantially fixedly oriented in space.

28. In combination, a space-stabilized element having means for resisting torques about any axis, mounting means providing said element with complete rotational freedom, a telescope, means connected to said space-stabilized element for supporting said telescope in accordance with the attitude of said space-stabilized element, means responsive to the radiant energy intercepted by said telescope for producing signals indicating the attitude of said telescope with respect to a predetermined celestial body, and means responsive to said signals for orienting said space-stabilized element and thereby causing said space-stabilized element to maintain said telescope in alignment with said celestial body.

29. The apparatus of claim 28, wherein said space-stabilized element comprises three gyroscopes and supporting means therefor, the axes of support of said gyroscopes being substantially mutually perpendicular.

References Cited in the file of this patent

UNITED STATES PATENTS

| | | |
|---|---|---|
| 844,837 | Vanzini | Feb. 19, 1907 |
| 865,277 | Stannard | Sept. 3, 1907 |
| 865,278 | Stannard | Sept. 3, 1907 |
| 1,016,240 | Alexieff | Jan. 30, 1912 |
| 1,086,242 | Sweeny | Feb. 3, 1914 |
| 1,733,531 | Dugan | Oct. 29, 1929 |
| 1,997,893 | Wilkinson | Apr. 16, 1935 |
| 2,039,878 | Boykow | May 5, 1936 |
| 2,046,890 | Young | July 7, 1936 |
| 2,048,834 | Young | July 28, 1936 |
| 2,077,398 | Clark | Apr. 20, 1937 |
| 2,102,587 | Eliel | Dec. 21, 1937 |
| 2,109,283 | Boykow | Feb. 22, 1938 |
| 2,155,402 | Clark | Apr. 25, 1939 |
| 2,180,516 | Fujimoto | Feb. 6, 1940 |
| 2,252,727 | Pepper | Aug. 19, 1941 |

(Other references on following page)

UNITED STATES PATENTS

| | | |
|---|---|---|
| 2,380,932 | Bates | Aug. 7, 1945 |
| 2,391,442 | Beach | Dec. 25, 1945 |
| 2,417,086 | Proskauer et al. | Mar. 11, 1947 |
| 2,444,933 | Jasperson | July 13, 1948 |
| 2,457,228 | Hanna et al. | Dec. 28, 1948 |
| 2,484,819 | Ferrill | Oct. 18, 1949 |
| 2,492,148 | Herbold | Dec. 27, 1949 |
| 2,462,925 | Varian | Mar. 1, 1949 |
| 2,517,612 | Varian | Aug. 8, 1950 |
| 2,532,402 | Herbold | Dec. 5, 1950 |

FOREIGN PATENTS

| | | |
|---|---|---|
| 33,746 | Netherlands | Sept. 16, 1934 |
| 160,868 | Great Britain | Mar. 29, 1921 |